United States Patent
Xing et al.

(10) Patent No.: US 10,422,960 B2
(45) Date of Patent: Sep. 24, 2019

(54) OPTICAL SWITCH AND OPTICAL SWITCHING SYSTEM

(71) Applicant: HUAWEI TECHNOLOGIES CO., LTD., Shenzhen, Guangdong (CN)

(72) Inventors: Jiejiang Xing, Wuhan (CN); Xin Tu, Shenzhen (CN); Ming Li, Wuhan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/251,172

(22) Filed: Jan. 18, 2019

(65) Prior Publication Data

US 2019/0154921 A1 May 23, 2019

Related U.S. Application Data

(63) Continuation of application No. PCT/CN2017/075313, filed on Mar. 1, 2017.

(30) Foreign Application Priority Data

Aug. 1, 2016 (CN) .......................... 2016 1 0620116

(51) Int. Cl.
*G02B 6/35* (2006.01)

(52) U.S. Cl.
CPC .......... *G02B 6/3502* (2013.01); *G02B 6/354* (2013.01); *G02B 6/3508* (2013.01); *G02B 6/3536* (2013.01); *G02B 6/3584* (2013.01)

(58) Field of Classification Search
None
See application file for complete search history.

(56) References Cited

U.S. PATENT DOCUMENTS

| | | | | |
|---|---|---|---|---|
| 5,367,584 A | * | 11/1994 | Ghezzo | G02B 6/1221 385/17 |
| 5,796,886 A | * | 8/1998 | Hong | G02B 6/122 385/21 |

(Continued)

FOREIGN PATENT DOCUMENTS

| CN | 1342272 A | 3/2002 |
|---|---|---|
| CN | 1536422 A | 10/2004 |

(Continued)

OTHER PUBLICATIONS

Chinese Office Action issued in Chinese Application No. 201610620116 dated Feb. 25, 2019, 7 pages.

(Continued)

*Primary Examiner* — Michael Stahl
(74) *Attorney, Agent, or Firm* — Fish & Richardson P.C.

(57) ABSTRACT

This application discloses an optical switch and an optical switching system. The optical switch includes a first waveguide, a second waveguide, and a movable waveguide, the first waveguide and the second waveguide are immovable relative to a substrate and are located in a plane, and an optical coupling relationship exists between the first waveguide and the second waveguide; the movable waveguide is movable relative to the substrate, and the movable waveguide is optically coupled to an input section or an output section of the first waveguide; when the movable waveguide is located at a first location, the movable waveguide is optically decoupled from the first waveguide, and the optical switch is in a through state; and when the movable waveguide is located at a second location, the movable waveguide is optically coupled to the input section or the output section, and the optical switch is in a drop state.

15 Claims, 10 Drawing Sheets

(56) References Cited

U.S. PATENT DOCUMENTS

| | | | |
|---|---|---|---|
| 6,195,478 B1 | 2/2001 | Fouquet | |
| 6,363,183 B1 | 3/2002 | Koh | |
| 6,453,086 B1 | 9/2002 | Tarazona | |
| 6,473,541 B1* | 10/2002 | Ho | B82Y 20/00 385/15 |
| 6,909,824 B1* | 6/2005 | Messica | G02B 6/12007 385/15 |
| 6,944,366 B2 | 9/2005 | Aksyuk et al. | |
| 2002/0181855 A1 | 12/2002 | Xue et al. | |
| 2003/0108274 A1 | 6/2003 | Haronian | |
| 2003/0223675 A1 | 12/2003 | Berger et al. | |
| 2004/0013344 A1 | 1/2004 | Blau | |
| 2004/0196522 A1 | 10/2004 | Lee et al. | |
| 2005/0163418 A1 | 7/2005 | Wong et al. | |
| 2005/0185884 A1 | 8/2005 | Haus et al. | |
| 2006/0002652 A1 | 1/2006 | Yang et al. | |
| 2008/0050063 A1* | 2/2008 | Arioli | G02B 6/3504 385/16 |
| 2016/0327751 A1* | 11/2016 | Wu | G02B 6/29344 |
| 2018/0070157 A1* | 3/2018 | Menard | H04J 14/02 |

FOREIGN PATENT DOCUMENTS

| | | | |
|---|---|---|---|
| CN | 1715977 A | | 1/2006 |
| JP | 57-4010 A | * | 1/1982 |
| JP | S571010 A | | 1/1982 |
| WO | 02069016 A2 | | 9/2002 |
| WO | 2005101115 A1 | | 10/2005 |
| WO | 2015147966 A2 | | 10/2015 |

OTHER PUBLICATIONS

Chinese Search Report issued in Chinese Application No. 2016106201164 dated Feb. 12, 2019, 3 pages.

J. Kim et al, 1100 1100 Port MEMS-Based Optical Crossconnect With 4-dB Maximum Loss. IEEE Photonics Technology Letters, vol. 15, No. 11, Nov. 2003, 3 pages.

Ken Tanizawa et al, Ultra-compact 32 x 32 strictly-non-blocking Siwire optical switch with fan-out LGA interposer. Optics Express, vol. 23, No. 13, Jun. 29, 2015, 8 pages.

Sangyoon Han et al, Large-scale silicon photonic switches with movable directional couplers. vol. 2, No. 41 Apr. 2015 / Optica, 6 pages.

Tae Joon Seok et al, Large-scale broadband digital silicon photonic switches with vertical adiabatic couplers. vol. 3, No. 1 / Jan. 2016 / Optica, 7 pages.

International Search Report and Written Opinion issued in International Application No. PCT/CN2017/075313 dated May 21, 2017, 19 pages.

Extended European Search Report issued in European Application No. 17836154.9 dated Jul. 10, 2019, 7 pages.

* cited by examiner

OPTICAL SWITCH AND OPTICAL SWITCHING SYSTEM

CROSS-REFERENCE TO RELATED APPLICATIONS

This application is a continuation of International Application No. PCT/CN2017/075313, filed on Mar. 1, 2017, which claims priority to Chinese Patent Application No. 201610620116.4, filed on Aug. 1, 2016, The disclosures of the aforementioned applications are hereby incorporated by reference in their entireties.

TECHNICAL FIELD

This application relates to the optical communications field, and more specifically, to an optical switch and an optical switching system.

BACKGROUND

Development of a dense wavelength division multiplexing (DWDM) technology has resulted in an increasing information transmission speed and capacity in an optical fiber communications link, and resulted in an increase in requirements for an information exchange speed and capacity in an optical communications network (for example, a metropolitan area network or a data center). An all-optical switching system becomes a development trend in the optical communications network. An optical switch is a key device for implementing the all-optical switching system. The optical switch may implement functions such as route selection, wavelength selection, optical cross-connection, and self-healing protection of an all-optical layer. Currently, an optical switch mainly includes a conventional mechanical optical switch, a micro-electro-mechanical system (MEMS) optical switch, a liquid crystal optical switch, a waveguide optical switch, a semiconductor optical amplifier optical switch, and the like.

A conventional MEMS optical switch is usually based on an electrostatic-actuation micro reflector structure, has advantages such as a low insertion loss, low crosstalk, a high extinction ratio, good scalability, and simple control, and may have at least 1000 ports in scale. However, because a rotation speed of a micro reflector is low, a switching speed of this type of optical switch usually can reach only a millisecond level. Consequently, a requirement for a future microsecond-level switching speed cannot be met. Because a process of a silicon-based waveguide optical switch is compatible with a mature complementary metal oxide semiconductor (CMOS) process, the silicon-based waveguide optical switch has advantages such as low costs and high integration, and it is easy to implement a large-scale optical switch matrix. A switching speed of the optical switch may reach a microsecond level by using a thermo-optic effect of silicon materials. However, the thermo-optic effect of the silicon materials is relatively weak, and a refractive index changes slightly. Therefore, a Mach-Zehnder interferometer (MZI) structure needs to be used to implement a 1×2 or 2×2 optical switch. The large-scale optical switch matrix is formed by cascading optical switches. The optical switch of the MZI structure has a noticeable loss in both a drop state and a through state, and the loss increases rapidly with an increase in dimensions of the optical switch matrix. The silicon-based waveguide optical switch has a problem of a high insertion loss, and this limits application of the silicon-based waveguide optical switch.

Therefore, implementing the optical switch matrix with a microsecond-level switching speed, a low insertion loss, a large quantity of ports, and low costs is an important part of future development of an all-optical switching technology.

SUMMARY

This application provides an optical switch and an optical switching system. The optical switch and the optical switching system have a high switching speed and a low loss.

According to a first aspect, this application provides an optical switch, where the optical switch is disposed on a substrate, and the optical switch includes a first waveguide, a second waveguide, and a movable waveguide; the first waveguide is immovable relative to the substrate, the first waveguide includes a first input section and a first output section, a first input port IP1 of the first waveguide is located at one end of the first input section, a first output port OP1 of the first waveguide is located at one end of the first output section, and the other end of the first input section is connected to the other end of the first output section; the second waveguide is immovable relative to the substrate, the second waveguide includes a second input section and a second output section, a second input port IP2 of the second waveguide is located at one end of the second input section, a second output port OP2 of the second waveguide is located at one end of the second output section, the other end of the second input section is connected to the other end of the second output section, both the first waveguide and the second waveguide are located in a first plane, and an optical coupling relationship exists between the first waveguide and the second waveguide; the movable waveguide is movable relative to the substrate; when the movable waveguide is located at a first location, (1) the movable waveguide is optically decoupled from the first waveguide; and (2) the IP1 and the OP2 are optically connected, the IP2 and the OP1 are optically connected, the IP1 and the OP1 are optically blocked, and the IP2 and the OP2 are optically blocked; and when the movable waveguide is located at a second location, (1) the movable waveguide is optically coupled to the first input section or the first output section; and (2) the IP1 and the OP1 are optically connected, the IP2 and the OP2 are optically connected, the IP1 and the OP2 are optically blocked, and the IP2 and the OP1 are optically blocked.

When the movable waveguide is located at the first location, the optical switch may be considered to be in a through (Through) state; and when the movable waveguide is located at the second location, the optical switch may be considered to be in a drop (Drop) state.

Optionally, the movable waveguide of the optical switch in the first aspect of this application may be a MEMS optical waveguide.

Optionally, the first plane of the optical switch in the first aspect of this application may be a plane parallel with the substrate.

Optionally, the first waveguide and the second waveguide of the optical switch in the first aspect of this application may be V-shaped.

The optical switch in the first aspect of this application includes two waveguides fastened on the substrate and one movable waveguide that is movable relative to the substrate. An optical coupling relationship exists between the two fastened waveguides, and a transmission direction of an optical signal is changed by changing a location relationship between the movable waveguide and one fixed waveguide. The optical switch does not include intersecting optical waveguides, so that a loss caused by intersecting is avoided.

In addition, when the optical switch is in the through state, the optical signal does not need to pass through a coupler; or when the optical switch is in the drop state, the optical signal needs to pass through only one coupler, thereby reducing a loss.

In a possible implementation of the first aspect, when the movable waveguide is located at the first location, along a transmission direction of an optical signal, an effective refractive index of the first waveguide gradually changes, both an effective refractive index of the first input section and an effective refractive index of the first output section also gradually change, an effective refractive index of the second waveguide gradually changes, and both an effective refractive index of the second input section and an effective refractive index of the second output section also gradually change.

Specifically, when the movable waveguide is located at the first location, along the transmission direction of the optical signal, the effective refractive index of the first waveguide gradually decreases, both the effective refractive index of the first input section and the effective refractive index of the first output section gradually decrease, the effective refractive index of the second waveguide gradually increases, and both the effective refractive index of the second input section and the effective refractive index of the second output section gradually increase. Alternatively, when the movable waveguide is located at the first location, along the transmission direction of the optical signal, the effective refractive index of the first waveguide gradually increases, both the effective refractive index of the first input section and the effective refractive index of the first output section gradually increase, the effective refractive index of the second waveguide gradually decreases, and both the effective refractive index of the second input section and the effective refractive index of the second output section gradually decrease.

In this possible implementation, the effective refractive indexes of the two fastened waveguides gradually change; when a location relationship between the movable waveguide and the first input section of the first waveguide is changed or a location relationship between the movable waveguide and the first output section of the first waveguide is changed, an effective refractive index of the first waveguide and the movable waveguide that are considered as a whole changes in comparison with an effective refractive index of the first waveguide when the movable waveguide is optically decoupled from the first waveguide. In this way, distribution of an optical field of the optical signal is affected, and switching of the optical switch between the through state and the drop state is implemented.

An effective refractive index at a junction of the first input section and the first output section may be equal to an effective refractive index at a junction of the second input section and the second output section. Specifically, an effective refractive index of a waveguide may be adjusted by changing a width of the waveguide. In addition, the effective refractive index of the waveguide may be adjusted based on a height or a material of the waveguide.

In a possible implementation of the first aspect, the first input port IP1 of the first input section has a first width, the junction of the first input section and the first output section has a second width, and the first output port OP1 of the first output section has a third width; and the second input port IP2 of the second input section has the third width, the junction of the second input section and the second output section has the second width, and the second output port OP2 of the second output section has the first width.

The first width is greater than the second width, and the second width is greater than the third width; or the first width is less than the second width, and the second width is less than the third width.

In a possible implementation of the first aspect, along the transmission direction of the optical signal, a gap between the first waveguide and the second waveguide first gradually decreases and then gradually increases; at a minimum gap between the first waveguide and the second waveguide, the first input section is connected to the first output section, and the second input section is connected to the second output section; a gap between the first input section and the second input section gradually decreases; and a gap between the first output section and the second output section gradually increases.

It should be understood that, when the optical signal is transmitted in the optical switch provided in the first aspect of this application, an optical field mode (which may also be referred to as an optical mode field) evolves.

Effective refractive indexes of components of the optical switch and a gap between the components are designed, so that optical signals input from the IP1 and the IP2 of the optical switch can be output from the OP2 and the OP1 in the through state, respectively, and can be output from the OP1 and the OP2 in the drop state, respectively.

In a possible implementation of the first aspect, the optical switch further includes an actuator, and a location of the movable waveguide is controlled by the actuator. The actuator and the movable waveguide may be connected by using a cantilever; or the actuator may include the movable waveguide and parallel plate electrodes. In this possible implementation, only one actuator is included. Because there are few actuators, both fabrication costs and a control difficulty are greatly reduced.

In a possible implementation of the first aspect, the movable waveguide is located in the first plane, and the movable waveguide can move in the first plane, so as to be optically coupled to the first input section or the first output section. In this possible implementation, the movable waveguide and the two fastened waveguides are located in a same plane or located at a same layer, greatly reducing a difficulty in a fabrication process; and the movable waveguide moves in the plane, greatly reducing a control difficulty.

In another possible implementation of the first aspect, the movable waveguide is not located in the first plane, and the movable waveguide is movable in a direction perpendicular to the first plane, so as to be optically coupled to the first input section or the first output section.

In another possible implementation of the first aspect, the movable waveguide may be located in a second plane parallel with the first plane, and the movable waveguide may move to a location in the second plane above the first input section or the first output section, so as to be optically coupled to the first input section or the first output section.

In another possible implementation of the first aspect, the movable waveguide may be higher than or lower than the first plane in which the first waveguide and the second waveguide are located, and the movable waveguide may move in a direction perpendicular to the first plane to a location above or below the first plane, so as to be optically coupled to the first input section or the first output section.

In a possible implementation of the first aspect, along the transmission direction of the optical signal, an effective refractive index of the movable waveguide gradually changes. In a specific implementation, along the transmission direction of the optical signal, a width of the movable waveguide may gradually change. The effective refractive index of the movable waveguide gradually changes, so that evolution of an optical mode of the optical signal may be more adiabatic, and a loss of the optical switch in the drop state is further reduced.

In a possible implementation of the first aspect, the optical switch further includes an optical power monitor, and the optical power monitor is configured to monitor optical power of at least one of the first waveguide, the second waveguide, the IP1, the OP1, the IP2, and the OP2. The optical switch in this possible implementation monitors power of an optical signal in each element, so as to estimate the location of the movable waveguide based on the power of the optical signal, thereby controlling the location of the movable waveguide more accurately.

According to a second aspect, this application provides an optical switching system, where the optical switching system is an M×N optical switch matrix, including M×N optical switches in the first aspect; each optical switch is denoted as $SC_{i,j}$, where a value of i is 1, 2, . . . , or M, and a value of j is 1, 2, . . . , or N; and the M×N optical switches are set as follows: (1) an $IP1_{i,j}$ and an $OP2_{i-1,j}$ are optically connected; and (2) an $IP2_{i,j}$ and an $OP1_{i,j-1}$ are optically connected, where a value range of i is 2 to M, and a value range of j is 2 to N.

In a possible implementation of the second aspect, at least one path that includes only one optical switch whose movable waveguide is located at a second location exists between an $IP1_{i,j}$ and an $OP1_{i,N}$; and at least one path that includes only one optical switch whose movable waveguide is located at the second location exists between an $IP2_{i,1}$ and an $OP2_{M,j}$, where a value range of i is 1 to M, and a value range of j is 1 to N.

The optical switching system in the second aspect can implement a microsecond-level switching speed and has advantages such as a low insertion loss, a large quantity of ports, and low costs.

It should be understood that, that a waveguide X and a waveguide Y are optically coupled (optically coupled) means that the waveguide X and the waveguide Y move close to each other, so that optical fields of the two waveguides affect each other and light energy is transferred between the two waveguides. That the waveguide X and the waveguide Y are optically decoupled (optically decoupled) means that the waveguide X and the waveguide Y move away from each other, so that the optical fields of the two waveguides do not affect each other and no light energy is transferred between the two waveguides. Certainly, it is inevitable that, when the waveguide X is optically decoupled from the waveguide Y, the optical fields of the two waveguides may still slightly affect each other, and a small amount of light energy may be transferred between the two waveguides in a form of crosstalk. It would be better if such crosstalk is lower.

It should be further understood that, that an input port A and an output port B are optically connected means that an optical signal channel is established between the input port A and the output port B. Certainly, it is inevitable that, when the input port A and the output port B are optically connected, a small amount of light may be output from another output port different from the output port B in a form of crosstalk, or a small amount of light may be transmitted from another input port different from the input port A to the output port B in a form of crosstalk. It would be better if such crosstalk is lower.

It should be further understood that, that the input port A and the output port B are optically blocked means that no optical signal channel exists between the input port A and the output port B. Certainly, it is inevitable that, when the input port A and the output port B are optically blocked, a small amount of light may be transmitted from the input port A to the output port B in a form of crosstalk. Likewise, it would be better if such crosstalk is lower.

It should be further understood that the effective refractive index (effective refractive index) may also be referred to as an equivalent refractive index and may be denoted as $n_{eff}$, where $n_{eff}=\beta/(2\pi/\lambda)$, $\beta$ is a propagation constant of an optical field mode of a waveguide, and $\lambda$ is a light wavelength in vacuum.

DESCRIPTION OF EMBODIMENTS

The following describes the technical solutions in this application with reference to the accompanying drawings.

As mentioned in the foregoing description, to implement an optical switch matrix with a microsecond-level switching speed, a low insertion loss, a large quantity of ports, and low costs, the prior art provides a MEMS optical switch matrix based on a crossbar architecture.

Figure 1:
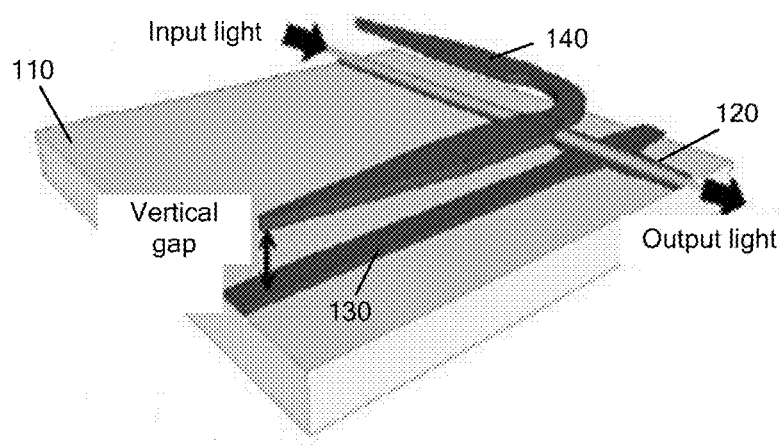
FIG. 1 and FIG. 2 are schematic diagrams of an existing optical switch in a through state and a drop state, respectively.
Figure 2:
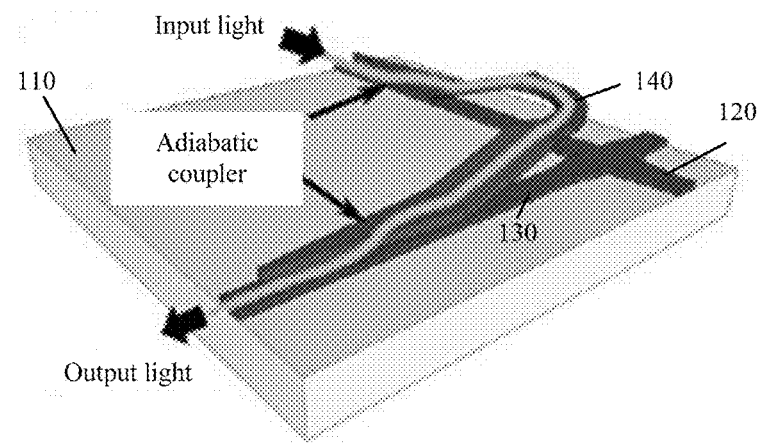

FIG. 1 and FIG. 2 are schematic diagrams of an optical switch 100 in the optical switch matrix in a through (Through) state and a drop (Drop) state, respectively. The optical switch 100 in the optical switch matrix is based on a silicon-based optical waveguide, and includes an upper-layer optical waveguide and a lower-layer optical waveguide. The lower-layer optical waveguide includes two intersecting bus optical waveguides (a through waveguide 120 and a drop waveguide 130) fastened on a substrate 110, the upper-layer optical waveguide includes a shunting optical waveguide 140 that can perpendicularly move relative to the substrate 110, and the shunting optical waveguide 140 is actuated by using static electricity.

As shown in FIG. 1, when the optical switch 100 is in the through (Through) state, no voltage is applied to an actuator, vertical gaps between the shunting optical waveguide 140 and the two bus optical waveguides are relatively large, and the shunting optical waveguide 140 and the two bus optical waveguides are not optically coupled. Input light is transmitted along the through waveguide 120 and perpendicularly intersects with the drop waveguide 130, and output light is output from the through waveguide 120. When the optical switch 100 is in the through (Through) state, a loss is at a level of 0.01 dB. As shown in FIG. 2, when the optical switch 100 is in the drop (Drop) state, a voltage is applied to the actuator, the shunting optical waveguide 140 perpendicularly moves downwards, so that the vertical gaps between the shunting optical waveguide 140 and the two bus optical waveguides decrease, and the shunting optical waveguide 140 is optically coupled to both the bus optical waveguides, thereby forming two adiabatic couplers (Adiabatic couplers) coupled in a vertical direction. Input light is first coupled from the through waveguide into the shunting optical waveguide 140 by using a first adiabatic coupler, and then coupled from the shunting optical waveguide 140 into the drop waveguide 130 by using a second adiabatic coupler, and output light is output from the drop waveguide 130. When the optical switch 100 is in the drop (Drop) state, a loss is at a level of 1 dB. Because a silicon photonics technology is used, a device size of the optical switch 100 is substantially reduced in comparison with that of a conventional optical switch using a MEMS micromirror, and a switching speed reaches a 1-microsecond level.

Figure 3:
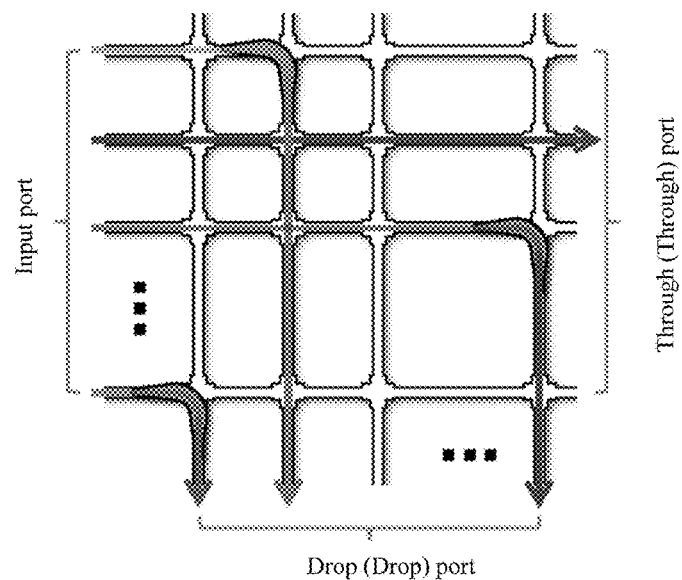
FIG. 3 is a schematic diagram of optical path switching of an optical switch matrix based on a crossbar architecture.

FIG. 3 is a schematic diagram of optical path switching of the MEMS optical switch matrix based on the crossbar architecture. As shown in FIG. 3, the optical switch matrix includes M×N optical switches, forming a matrix with M rows and N columns. Each of the M×N optical switches is located at an intersection of each row and each column. A first output port OP1 of one of N optical switches in each row is connected to a first input port IP1 of an adjacent optical switch, a first input port IP1, connected to no first output port OP1 of another optical switch, of an optical switch in the N optical switches in each row is an input port of the optical switch matrix, and a first output port OP1 connected to no first input port IP1 of another optical switch, of an optical switch in the N optical switches in each row is a through (Through) port of the optical switch matrix. A second output port OP2 of one of M optical switches in each column is connected to a second input port IP2 of an adjacent optical switch, and a second output port OP2, connected to no second input port IP2 of another optical switch, of an optical switch in the M optical switches in each column is a drop (Drop) port of the optical switch matrix.

On each optical path of the optical switch matrix shown in FIG. 3, a maximum of one optical switch is in the drop (Drop) state with a relatively high loss, and remaining optical switches are in the through (Through) state with a quite low loss. Therefore, when there are a relatively large quantity of ports, a loss caused by the MEMS optical switch matrix based on the crossbar architecture is much lower than that caused by a silicon-based optical switch of another type. The MEMS optical switch matrix has advantages such as low costs, a high switching speed, a low insertion loss, and a large quantity of ports.

However, a loss may be brought at an intersection of the two intersecting optical waveguides that are located at a lower layer of the optical switch shown in FIG. 1 or FIG. 2. In addition, when the optical switch is in the drop (Drop) state, an optical signal needs to pass through the two adiabatic couplers, and this not only increases the loss, but also increases a quantity of actuators and a control difficulty.

Figure 4:
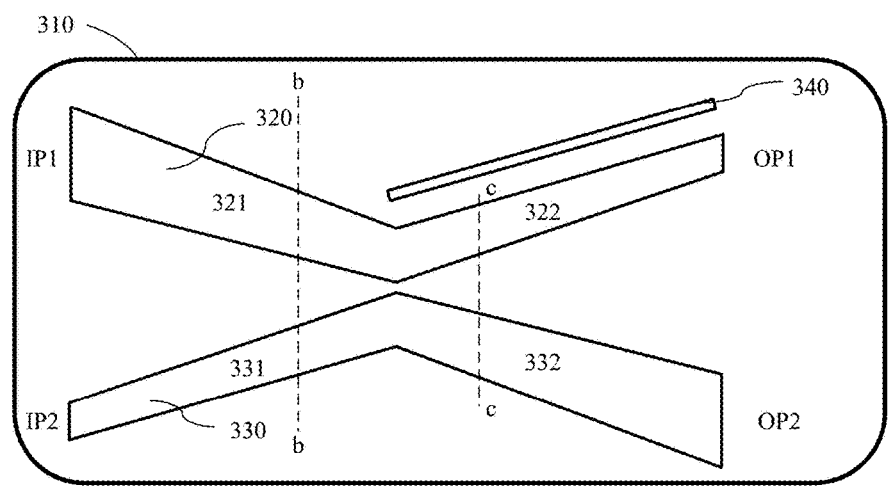
FIG. 4 and FIG. 5 are schematic structural block diagrams of an optical switch according to an embodiment of this application.
Figure 5:
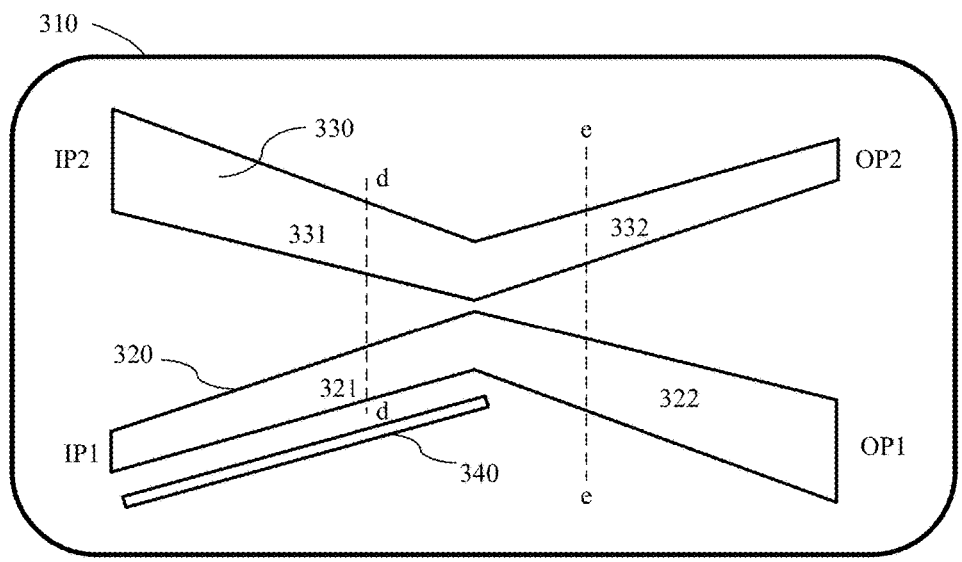

In view of the foregoing problems, an embodiment of this application provides a microsecond-level optical switch 300 having a low insertion loss. As shown in FIG. 4 and FIG. 5, the optical switch 300 is disposed on a substrate 310. The optical switch 300 includes a first waveguide 320, a second waveguide 330, and a movable waveguide 340. The first waveguide 320 is immovable relative to the substrate 310, the first waveguide 320 includes a first input section 321 and a first output section 322, a first input port IP1 of the first waveguide 320 is located at one end of the first input section 321, a first output port OP1 of the first waveguide 320 is located at one end of the first output section 322, and the other end of the first input section 321 is connected to the other end of the first output section 322. The second waveguide 330 is immovable relative to the substrate 310, the second waveguide 330 includes a second input section 331 and a second output section 332, a second input port IP2 of the second waveguide 330 is located at one end of the second input section 331, a second output port OP2 of the second waveguide 330 is located at one end of the second output section 332, and the other end of the second input section 331 is connected to the other end of the second output section 332. Both the first waveguide 320 and the second waveguide 330 are located in a first plane, and an optical coupling relationship exists between the first waveguide 320 and the second waveguide 330. The movable waveguide 340 is movable relative to the substrate 310.

The movable waveguide 340 of the optical switch shown in FIG. 4 may be optically coupled to the first output section 322.

The movable waveguide 340 of the optical switch shown in FIG. 5 may be optically coupled to the first input section 321.

When the movable waveguide 340 is located at a first location, (1) the movable waveguide 340 is optically decoupled from the first waveguide 320; and (2) the IP1 and the OP2 are optically connected, the IP2 and the OP1 are optically connected, the IP1 and the OP1 are optically blocked, and the IP2 and the OP2 are optically blocked. When the movable waveguide 340 is located at a second location, (1) the movable waveguide 340 is optically coupled to the first input section 321 or the first output section 322; and (2) the IP1 and the OP1 are optically connected, the IP2 and the OP2 are optically connected, the IP1 and the OP2 are optically blocked, and the IP2 and the OP1 are optically blocked.

Optionally, it may be considered that, when the movable waveguide 340 is located at the first location, the optical switch is in a through (Through) state; and when the movable waveguide 340 is located at the second location, the optical switch is in a drop (Drop) state.

Optionally, the movable waveguide in this embodiment of this application may be a MEMS optical waveguide.

Optionally, the first plane in this embodiment of this application may be a plane parallel with the substrate 310.

The optical switch in this embodiment of this application includes two waveguides fastened on the substrate and one movable waveguide that is movable relative to the substrate. An optical coupling relationship exists between the two fastened waveguides, and a transmission direction of an optical signal is changed by changing a location relationship between the movable waveguide and one fixed waveguide. The optical switch in this embodiment of this application does not include intersecting optical waveguides; in this case, a loss caused by intersecting is avoided. In addition, when the optical switch is in the through state, the optical signal does not need to pass through a coupler; or when the optical switch is in the drop state, the optical signal needs to pass through only one coupler, thereby reducing a loss.

Optionally, as shown in FIG. 4 and FIG. 5, the first waveguide 320 and the second waveguide 330 in this embodiment of this application may be V-shaped. Alternatively, the first waveguide 320 and the second waveguide 330 may be in another shape. This is not limited in this embodiment of this application.

It should be understood that, in this embodiment of this application, that a waveguide X and a waveguide Y are optically coupled (optically coupled) means that the waveguide X and the waveguide Y move close to each other, so that optical fields of the two waveguides affect each other and light energy is transferred between the two waveguides. That the waveguide X and the waveguide Y are optically decoupled (optically decoupled) means that the waveguide X and the waveguide Y move away from each other, so that the optical fields of the two waveguides do not affect each other and no light energy is transferred between the two waveguides. Certainly, it is inevitable that, when the waveguide X is optically decoupled from the waveguide Y, the optical fields of the two waveguides may still slightly affect each other, and a small amount of light energy may be transferred between the two waveguides in a form of crosstalk. It would be better if such crosstalk is lower.

It should be further understood that, that an input port A and an output port B are optically connected means that an optical signal channel is established between the input port A and the output port B. Certainly, it is inevitable that, when the input port A and the output port B are optically connected, a small amount of light may be output from another output port different from the output port B in a form of crosstalk, or a small amount of light may be transmitted from another input port different from the input port A to the output port B in a form of crosstalk. It would be better if such crosstalk is lower.

It should be further understood that, that the input port A and the output port B are optically blocked means that no optical signal channel exists between the input port A and the output port B. Certainly, it is inevitable that, when the input port A and the output port B are optically blocked, a small amount of light may be transmitted from the input port A to the output port B in a form of crosstalk. Likewise, it would be better if such crosstalk is lower.

It should be further understood that sizes and shapes of the substrate 310, the first waveguide 320, the second waveguide 330, and the movable waveguide 340 and locations and directions of the IP1, the OP1, the IP2, and the OP2 that are shown in FIG. 4 and FIG. 5 are all examples and constitute no limitation on this embodiment of this application. When only one input port of the IP1 and the IP2 is used, the optical switch may be used as a 1×2 optical switch.

When both the IP1 and the IP2 are used, the optical switch is used as a 2×2 optical switch.

Specifically, that input light 1 is input from the IP1 of the optical switch shown in FIG. 4 and input light 2 is input from the IP2 of the optical switch shown in FIG. 4 is used as an example for description.

Figure 6:
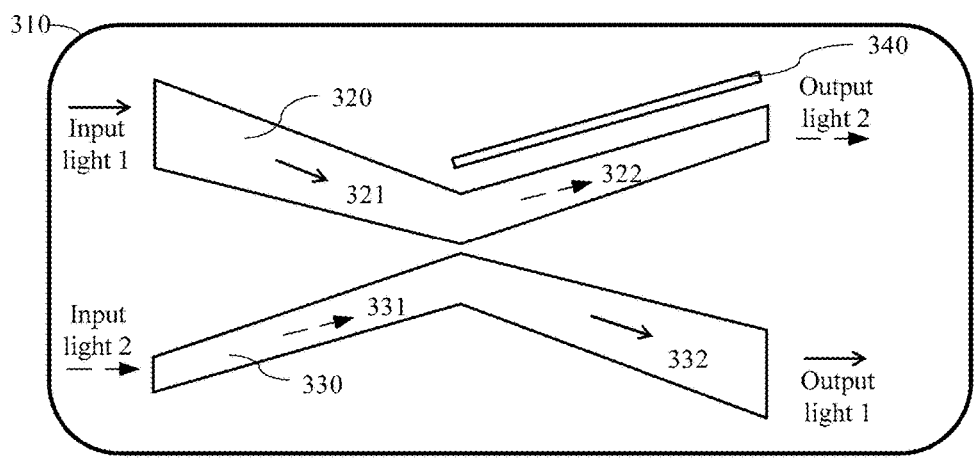
FIG. 6 is a schematic block diagram of an optical switch in a through state according to an embodiment of this application.

As shown in FIG. 6, when the movable waveguide 340 is located at the first location, the movable waveguide 340 is optically decoupled from the first output section 322 (the movable waveguide 340 is not optically coupled to the first output section 322), and the optical switch is in the through (Through) state. The IP1 and the OP2 are optically connected, the IP2 and the OP1 are optically connected, the IP1 and the OP1 are optically blocked, and the IP2 and the OP2 are optically blocked. The input light 1 is input from the IP1 and transmitted in the first input section 321 of the first waveguide 320, and then enters the second output section 332 of the second waveguide 330 for transmission; and output light 1 is output from the OP2. The input light 2 is input from the IP2 and transmitted in the second input section 331 of the second waveguide 330, and then enters the first output section 322 of the first waveguide 320 for transmission; and output light 2 is output from the OP1.

Figure 7:
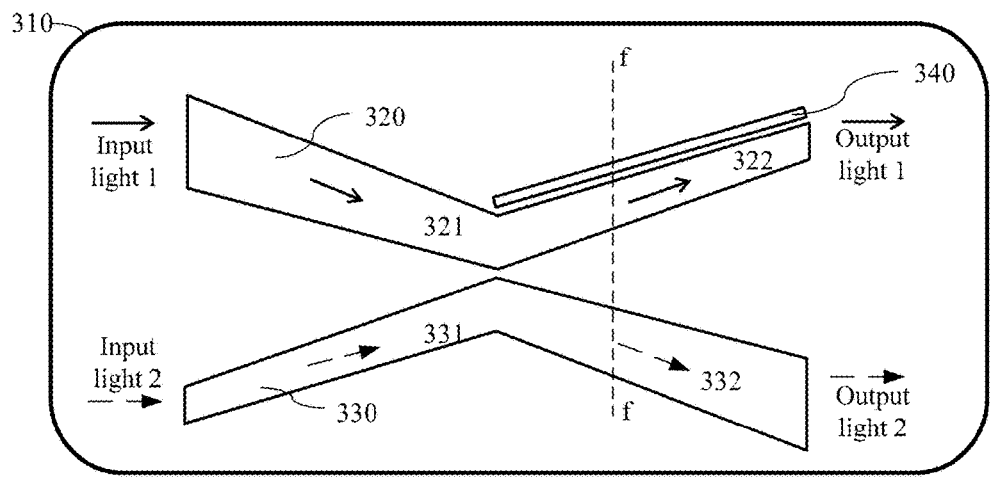
FIG. 7 is a schematic block diagram of an optical switch in a drop state according to an embodiment of this application.

As shown in FIG. 7, when the movable waveguide 340 is located at the second location, the movable waveguide 340 is optically coupled to the first output section 322, and the optical switch is in the drop (Drop) state. The IP1 and the OP1 are optically connected, the IP2 and the OP2 are optically connected, the IP1 and the OP2 are optically blocked, and the IP2 and the OP1 are optically blocked. The input light 1 is input from the IP1 and transmitted in the first input section 321 of the first waveguide 320, and then enters the first output section 322 of the first waveguide 320 for transmission; and the output light 1 is output from the OP1. The input light 2 is input from the IP2 and transmitted in the second input section 331 of the second waveguide 330, and then enters the second output section 332 of the second waveguide 330 for transmission; and the output light 2 is output from the OP2.

When the input light 1 is input from the IP1 of the optical switch shown in FIG. 5, the input light 2 is input from the IP2 of the optical switch shown in FIG. 5, the movable waveguide 340 is at different locations, similar results are obtained. Details are not described herein again.

Optionally, in an embodiment, effective refractive indexes of the two fastened waveguides may gradually change; when a location relationship between the movable waveguide and the first input section of the first waveguide is changed or a location relationship between the movable waveguide and the first output section of the first waveguide is changed, an effective refractive index of the first waveguide and the movable waveguide that are considered as a whole changes in comparison with an effective refractive index of the first waveguide when the movable waveguide is optically decoupled from the first waveguide. In this way, distribution of an optical field of the optical signal is affected, and switching of the optical switch between the through state and the drop state is implemented.

A structure of the optical switch may be designed according to the following rules: When the movable waveguide is located at the first location, along a transmission direction of an optical signal, the effective refractive index of the first waveguide gradually changes, both an effective refractive index of the first input section and an effective refractive index of the first output section gradually change, an effective refractive index of the second waveguide gradually changes, and both an effective refractive index of the second input section and an effective refractive index of the second output section gradually change.

Specifically, it may be the following case: When the movable waveguide is located at the first location (that is, when the movable waveguide is optically decoupled from the first waveguide), along the transmission direction of the optical signal, the effective refractive index of the first waveguide gradually decreases, both the effective refractive index of the first input section and the effective refractive index of the first output section gradually decrease, the effective refractive index of the second waveguide gradually increases, and both the effective refractive index of the second input section and the effective refractive index of the second output section gradually increase. In this case, to implement that, when the movable waveguide 340 is located at the first location, the IP1 and the OP2 are optically connected, the IP2 and the OP1 are optically connected, the IP1 and the OP1 are optically blocked, and the IP2 and the OP2 are optically blocked, the effective refractive index of the first waveguide is compared with the effective refractive index of the second waveguide, and the following may be met: For the first input section 321 and the second input section 331, at a b-b cross section (and any cross section, parallel with the b-b cross section, on the first input section 321 and the second input section 331) shown in FIG. 4, the effective refractive index of the first input section 321 is greater than the effective refractive index of the second input section 331; and for the first output section 322 and the second output section 332, at a c-c cross section (and any cross section, parallel with the c-c cross section, on the first output section 322 and the second output section 332) shown in FIG. 4, the effective refractive index of the first output section 322 is less than the effective refractive index of the second output section 332.

Alternatively, it may be the following case: When the movable waveguide is located at the first location, along the transmission direction of the optical signal, the effective refractive index of the first waveguide gradually increases, both the effective refractive index of the first input section and the effective refractive index of the first output section gradually increase, the effective refractive index of the second waveguide gradually decreases, and both the effective refractive index of the second input section and effective refractive index of the second output section gradually decrease. In this case, to implement that, when the movable waveguide 340 is located at the first location, the IP1 and the OP2 are optically connected, the IP2 and the OP1 are optically connected, the IP1 and the OP1 are optically blocked, and the IP2 and the OP2 are optically blocked, the effective refractive index of the first waveguide is compared with the effective refractive index of the second waveguide, and the following may be met: For the first input section 321 and the second input section 331, at a d-d cross section (and any cross section, parallel with the d-d cross section, on the first input section 321 and the second input section 331) shown in FIG. 5, the effective refractive index of the first input section 321 is less than the effective refractive index of the second input section 331; and for the first output section 322 and the second output section 332, at an e-e cross section (and any cross section, parallel with the e-e cross section, on the first output section 322 and the second output section 332) shown in FIG. 5, the effective refractive index of the first output section 322 is greater than the effective refractive index of the second output section 332.

It should be understood that, in this embodiment of this application, a function of the movable waveguide 340 is being optically coupled to or optically decoupled from the first waveguide, to control the effective refractive index of the movable waveguide and the first waveguide that are considered as a whole, instead of transmitting an optical signal. By using a structure design, when the movable waveguide is optically coupled to the first waveguide, as few optical mode fields as possible should be expanded into the movable waveguide 340, thereby reducing an optical signal loss.

It should be further understood that an effective refractive index at a junction of the first input section 321 and the first output section 322 may be equal to an effective refractive index at a junction of the second input section 331 and the second output section 332. In this way, an optical signal in one of the first waveguide 320 and the second waveguide 330 can enter the other of the first waveguide 320 and the second waveguide 330 smoothly for transmission.

An effective refractive index of a waveguide may be adjusted by changing a cross-section structure (for example, a width, a height, and a shape) of the waveguide. A cross section of an existing optical waveguide is usually rectangular, and the effective refractive index of the waveguide is adjusted by changing the width of the waveguide.

It should be understood that the effective refractive index (effective refractive index) may also be referred to as an equivalent refractive index and may be denoted as $n_{\mathit{eff}}$, where $n_{\mathit{eff}} = \beta/(2\pi/\lambda)$, $\beta$ is a propagation constant of an optical field mode of a waveguide, and $\lambda$ is a light wavelength in vacuum.

In this embodiment of this application, the first input port IP1 of the first input section 321 may have a first width W1, the junction of the first input section 321 and the first output section 322 may have a second width W2, and the first output port OP1 of the first output section 322 may have a third width W3; and the second input port IP2 of the second input section 331 may have the third width W3, the junction of the second input section 331 and the second output section 332 may have the second width W2, and the second output port OP2 of the second output section 332 may have the first width W1.

Figure 8:
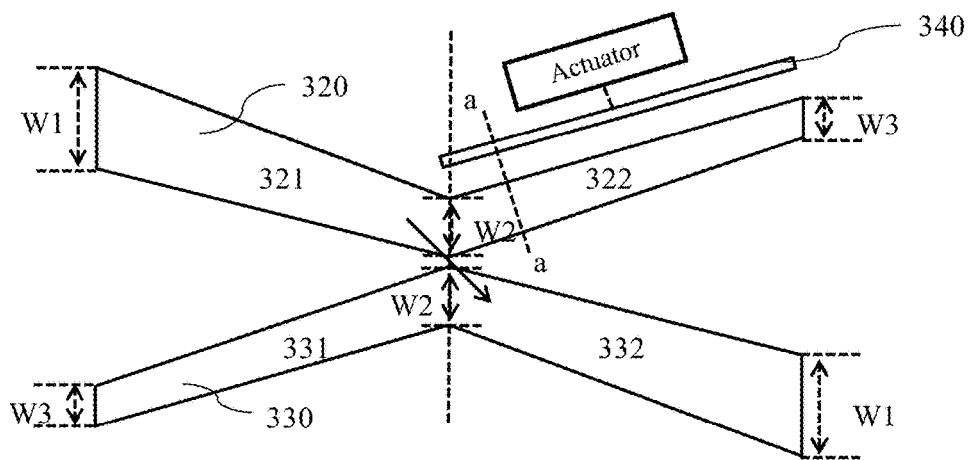
FIG. 8 is a schematic structural block diagram of an optical switch according to another embodiment of this application.

Optionally, in an embodiment of this application, as shown in FIG. 8, the three widths may be set as follows: The first width W1 is greater than the second width W2, and the second width W2 is greater than the third width W3.

Optionally, in another embodiment of this application, the three widths may be further set as follows: The first width W1 is less than the second width W2, and the second width W2 is less than the third width W3.

Alternatively, the effective refractive index of the waveguide may be adjusted by changing a material of the waveguide or adjusted by using another method. This is not limited in this embodiment of this application.

The following uses an example to describe in detail an effective refractive index of a related section of the optical switch shown in FIG. 7 whose movable waveguide 340 is located at the second location.

When the movable waveguide 340 is located at the second location, the movable waveguide 340 is optically coupled to the first output section 322. To implement that, when the movable waveguide 340 is located at the second location, the IP1 and the OP1 are optically connected, the IP2 and the OP2 are optically connected, the IP1 and the OP2 are optically blocked, and the IP2 and the OP1 are optically blocked, an effective refractive index of the first output section 322 and the movable waveguide 340 that are considered as a whole and the effective refractive index of the second output section 332 may meet the following: At an f-f cross section (and any cross section, parallel with the f-f cross section, on the first output section 322 and the second output section 332) shown in FIG. 7, the effective refractive index of the first output section 322 and the movable waveguide 340 that are considered as a whole is greater than the effective refractive index of the second output section 332.

Along the transmission direction of the optical signal, the effective refractive index of the first output section 322 and the movable waveguide 340 that are considered as a whole may gradually change, for example, may gradually increase, gradually decrease, may remain unchanged, or may change irregularly. This is not limited in this embodiment of this application.

For the optical switch shown in FIG. 5 whose movable waveguide 340 can be optically coupled to the first input section 321, for a condition that needs to be met by an effective refractive index of a related section when the movable waveguide 340 is located at the second location, a principle is similar to a principle of the optical switch shown in FIG. 7. Details are not described herein again.

Optionally, to implement switching of the optical switch between the through state and the drop state, as shown in a design in FIG. 4, FIG. 5, FIG. 6, FIG. 7, or FIG. 8, along the transmission direction of the optical signal, a gap between the first waveguide and the second waveguide first gradually decreases and then gradually increases; at a minimum gap between the first waveguide and the second waveguide, the first input section is connected to the first output section, and the second input section is connected to the second output section; a gap between the first input section and the second input section gradually decreases; and a gap between the first output section and the second output section gradually increases.

Effective refractive indexes of components of the optical switch and a gap between the components are designed, so that optical signals input from the IP1 and the IP2 of the optical switch can be output from the OP2 and the OP1 in the through state, respectively, and can be output from the OP1 and the OP2 in the drop state, respectively.

The optical switch may further include an actuator, and a location of the movable waveguide is controlled by the actuator, as shown in FIG. 8.

Specifically, the actuator may be excited by an electric field, a magnetic field, an optical field, a thermal field, or the like, and the actuator drives, under the foregoing excitation, the movable waveguide to move. The actuator may be connected to the movable waveguide by using a cantilever. The cantilever may be a spring, or may be another component made of an elastic material. This is not limited in this embodiment of this application.

Alternatively, the actuator includes the movable waveguide and parallel plate electrodes. In a specific example, the movable waveguide 340 may be grounded, and a voltage apparatus may apply a voltage to the parallel plate electrodes, so as to control the location of the movable waveguide 340 by using a voltage difference. When no voltage is applied to the electrodes, the electrodes do not attract the movable waveguide 340. In this case, the movable waveguide 340 is coupled to the first waveguide 320, and the optical switch is in the through state. When a voltage is applied to the electrodes, the electrodes attract the movable waveguide 340. In this case, the movable waveguide 340 is decoupled from the first waveguide 320, and the optical switch is in the drop state. Certainly, the actuator that includes the movable waveguide and the parallel plate electrodes may have another form.

Optionally, it should be understood that one of the movable waveguide 340 and the first waveguide 320 may be directly grounded, and a voltage of the other of the movable waveguide 340 and the first waveguide 320 is controlled by the voltage apparatus, so as to control the location of the movable waveguide 340 by using a voltage difference. A specific form of the actuator is not limited in this embodiment of this application.

Figure 9:
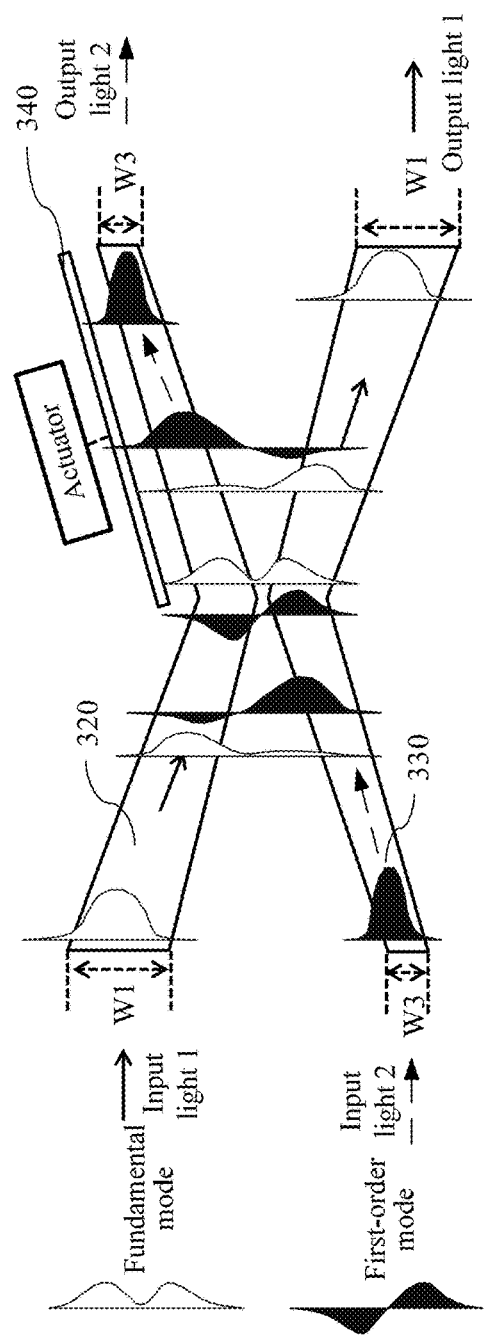
FIG. 9 shows a mode change of an optical signal in an optical switch in a through state according to an embodiment of this application.

It should be understood that, when the optical signal is transmitted in the optical switch in this embodiment of this application, an optical field mode (which may also be referred to as an optical mode field) evolves. The evolution herein is usually adiabatic evolution (adiabatic evolution). As shown in FIG. 9, at the input ports, the width W1 of the first input section 321 of the first waveguide 320 is greater than the width W3 of the second input section 331 of the second waveguide 330. Therefore, the equivalent refractive index of the first waveguide 320 at the first input port IP1 is greater than the equivalent refractive index of the second waveguide 330 at the second input port IP2. Input light 1 input from the first waveguide 320 stimulates a symmetric mode (a fundamental mode), and input light 2 input from the second waveguide 330 stimulates an antisymmetric mode (a first-order mode). At the first input section 321 and the second input section 331, a gap between the two waveguides gradually decreases, and optical coupling is gradually enhanced, the width of the first input section 321 gradually decreases, and the width of the second input section 331 gradually increases. Optical fields of the fundamental mode and the first-order mode change from being respectively restricted in the first waveguide 320 and the second waveguide 330 to being gradually transferred to the second waveguide 330 and the first waveguide 320. At ends of the first input section 321 and the second input section 331, widths of the two waveguides are equal, and the optical fields of the fundamental mode and the first-order mode are evenly distributed in the two waveguides. At the first output section 322 and the second output section 332, the movable waveguide is far away from the first output section 322, no coupling relationship exists between the movable waveguide and the first output section 322, the width of the first waveguide 320 continues to decrease, and the width of the second waveguide 330 continues to increase. The optical fields of the fundamental mode and the first-order mode continue to be transferred to the second waveguide 330 and the first waveguide 320, respectively. At ends of the first output section 322 and the second output section 332, the optical fields of the fundamental mode and the first-order mode are respectively restricted in the second waveguide 330 and the first waveguide 320. In this way, an optical signal is coupled from a waveguide into another waveguide. In this case, a state of the optical switch may be referred to as the through (Through) state. A coupling loss is quite low in the through (Through) state and is approximately at a level of 0.01 dB through simulation calculation.

Figure 10:
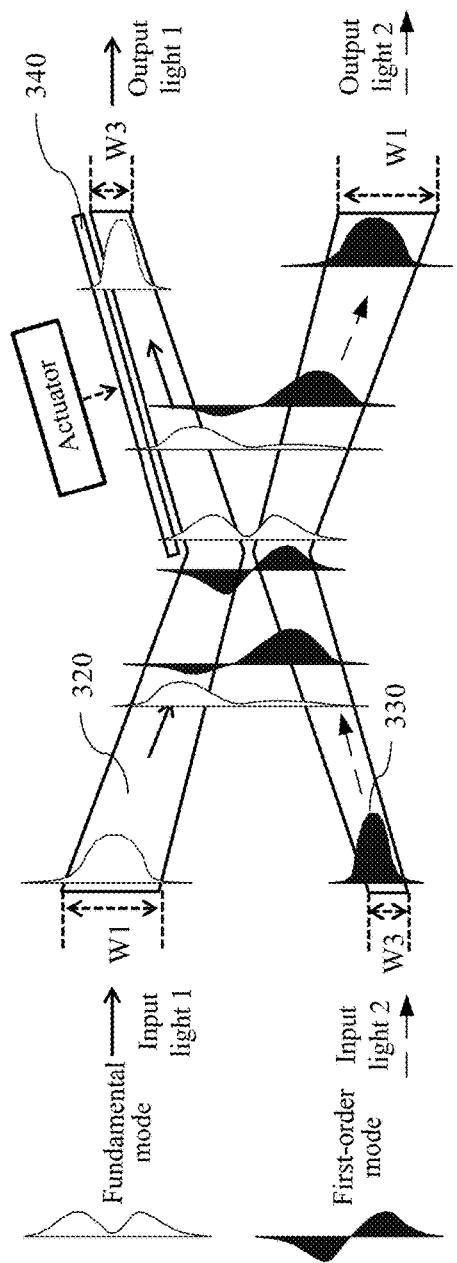
FIG. 10 shows a mode change of an optical signal in an optical switch in a drop state according to an embodiment of this application.

As shown in FIG. 10, a voltage is applied to the actuator, so that the movable waveguide moves close to the first output section 322 of the first waveguide 320. Refractive index distribution in an output area of the optical switch changes, so that the effective refractive index of the first waveguide 320 in the output area increases to a level of 0.01 to 0.1. Optical fields of a fundamental mode and a first-order mode gradually return to the first waveguide 320 and the second waveguide 330, thereby implementing optical path switching. In this case, a state of the optical switch may be referred to as the drop (Drop) state. A loss in the drop (Drop) state is approximately at a level of 0.1 dB through simulation calculation.

In this embodiment of this application, only one actuator is included. Because there are few actuators, both fabrication costs and a control difficulty are greatly reduced.

Optionally, in an embodiment, the movable waveguide is located in the first plane, and the movable waveguide may move in the first plane, so as to be optically coupled to the first input section or the first output section.

Figure 11:
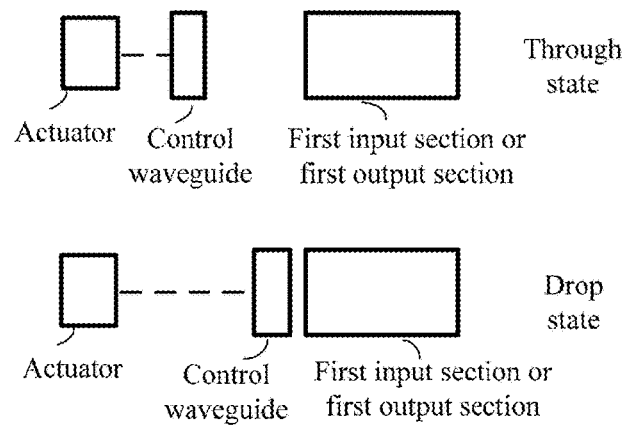
FIG. 11 is a schematic diagram of a movement manner of a movable waveguide of an optical switch according to an embodiment of this application.

Specifically, a view of an a-a cross section in FIG. 8 may be shown in FIG. 11. The movable waveguide 340, the first waveguide 320, and the second waveguide 330 are located in a same plane (that is, the first plane), and the movable waveguide 340 may move in the first plane under control of the actuator. As shown in FIG. 11, the movable waveguide 340 may move in a translation manner, or may move in another manner, so as to be optically coupled to the first input section 321 or the first output section 322. In this embodiment of this application, the movable waveguide and the two fastened waveguides are located in a same plane or located at a same layer, greatly reducing a difficulty in a fabrication process; and the movable waveguide moves in the plane, thereby greatly reducing a control difficulty.

Optionally, in another embodiment, the movable waveguide is not located in the first plane, and the movable waveguide may move in a direction perpendicular to the first plane, so as to be optically coupled to the first input section or the first output section.

A possible implementation is that the movable waveguide may not be located in the first plane, and the movable waveguide may move to the first plane in the direction perpendicular to the first plane, so as to be optically coupled to the first input section or the first output section.

Figure 12:
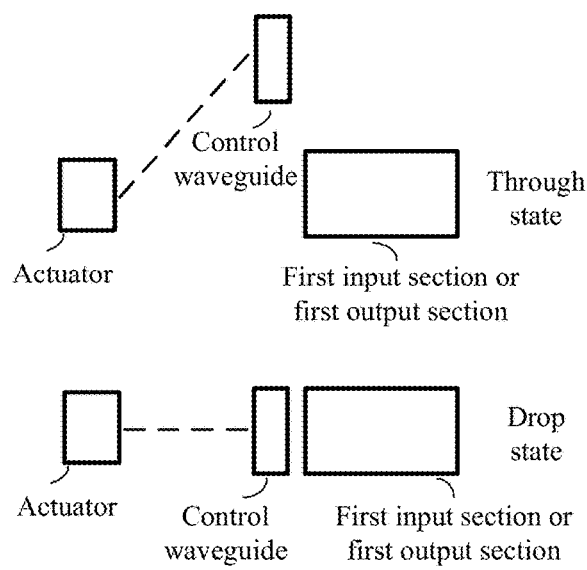
FIG. 12 and FIG. 13 are schematic diagrams of movement manners of a movable waveguide of an optical switch according to an embodiment of this application.

Specifically, a view of an a-a cross section in FIG. 8 may be shown in FIG. 12. In the through (Through) state, the movable waveguide 340 is higher than the first plane in which the first waveguide 320 and the second waveguide 330 are located. As shown in FIG. 12, the movable waveguide 340 may move to the first plane in the direction perpendicular to the first plane, so as to be optically coupled to the first input section 321 or the first output section 322, thereby switching to the drop (Drop) state.

Figure 13:
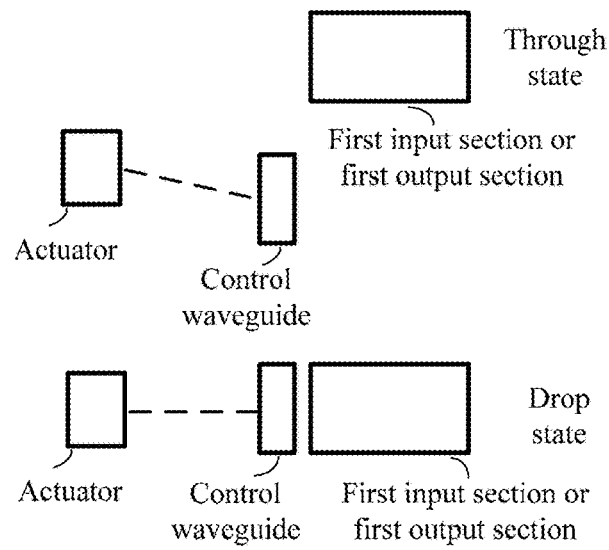

Alternatively, a view of an a-a cross section in FIG. 8 may be shown in FIG. 13. In the through (Through) state, the movable waveguide 340 is lower than the first plane in which the first waveguide 320 and the second waveguide 330 are located. As shown in FIG. 13, the movable waveguide 340 may move to the first plane in the direction perpendicular to the first plane, so as to be optically coupled to the first input section 321 or the first output section 322, thereby switching to the drop (Drop) state.

Figure 14:
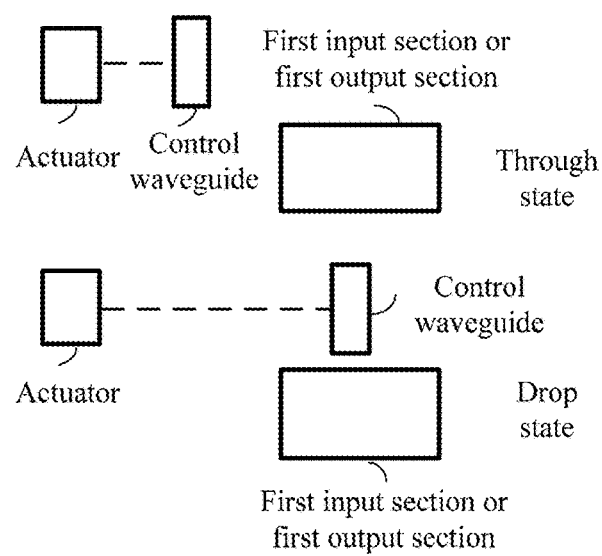
FIG. 14 and FIG. 15 are schematic diagrams of movement manners of a movable waveguide of an optical switch according to an embodiment of this application.
Figure 15:
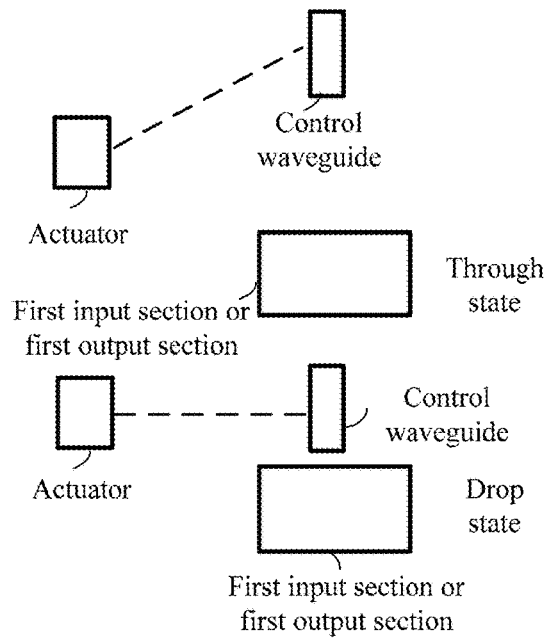

In another possible implementation, a view of an a-a cross section in FIG. 8 may be further shown in FIG. 14 or FIG. 15. As shown in FIG. 14, in the through (Through) state, the movable waveguide 340 may be located in a second plane parallel with the first plane. As shown in FIG. 14, the movable waveguide 340 may move to a location in the second plane above the first input section 321 or the first output section 322, so as to be optically coupled to the first input section 321 or the first output section 322, thereby switching to the drop (Drop) state.

As shown in FIG. 15, in the through (Through) state, the movable waveguide 340 may be higher than or lower than the first plane in which the first waveguide 320 and the second waveguide 330 are located. As shown in FIG. 15, the movable waveguide 340 may move in the direction perpendicular to the first plane to a location above or below the first plane, so as to be optically coupled to the first input section 321 or the first output section 322, thereby switching to the drop (Drop) state.

Alternatively, a location of the movable waveguide relative to the two fastened waveguides may be in another form different from the forms in FIG. 11 to FIG. 15, and the movable waveguide may move in another manner different from the movement manners in FIG. 11 to FIG. 15. This is not limited in this embodiment of this application.

Optionally, in an embodiment, along the transmission direction of the optical signal, an effective refractive index of the movable waveguide may gradually change. In a specific example, along the transmission direction of the optical signal, a width of the movable waveguide may gradually change.

Figure 16:
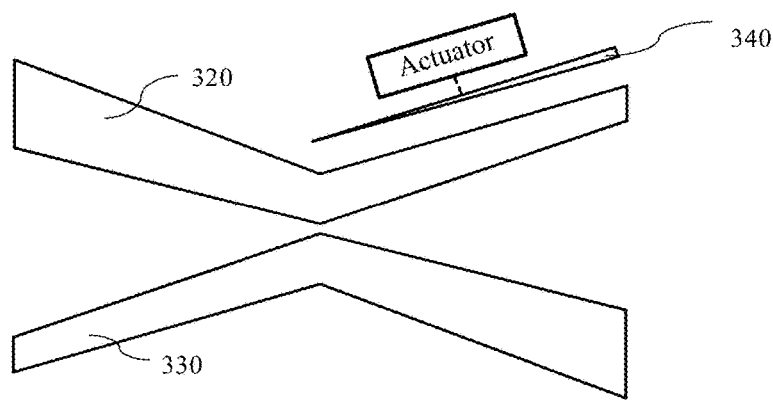
FIG. 16 is a schematic structural block diagram of an optical switch in a through state according to another embodiment of this application.
Figure 17:
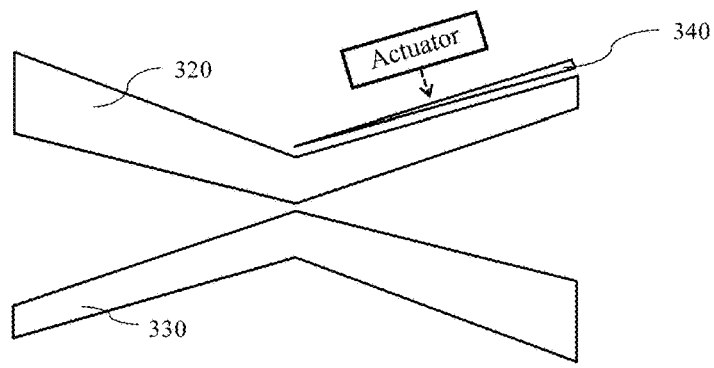
FIG. 17 is a schematic structural block diagram of an optical switch in a drop state according to another embodiment of this application.

Specifically, as shown in FIG. 16 and FIG. 17, along a transmission direction of an optical signal, a width of a movable waveguide 340 gradually changes. An effective refractive index of the movable waveguide 340 gradually changes, so that evolution of an optical mode of the optical signal may be more adiabatic, and a loss of an optical switch in a drop (Drop) state is further reduced. Preferably, along the transmission direction of the optical signal, an effective refractive index of a first output section 322 and the movable waveguide 340 that are considered as a whole may gradually increase.

Optionally, in an embodiment, the optical switch in this embodiment of this application may further include an optical power monitor. The optical power monitor is configured to monitor optical power of at least one of the first waveguide, the second waveguide, the IP1, the OP1, the IP2, and the OP2. The optical switch in this embodiment of this application monitors power of an optical signal in each element, so as to estimate the location of the movable waveguide 340 according to the power of the optical signal, thereby controlling the location of the movable waveguide 340 more accurately.

It should be understood that, for brevity, the substrate 310 is omitted and not shown in embodiments in FIG. 8 to FIG. 16 and in FIG. 17 in this application.

Based on the optical switch in the embodiments of this application, this application further provides an optical switching system. The optical switching system is an M×N optical switch matrix, including M×N optical switches mentioned in the foregoing description. Each optical switch is denoted as $SC_{i,j}$, where a value of i is 1, 2, . . . , or M, and a value of j is 1, 2, . . . , or N. The M×N optical switches are set as follows: (1) An $IP1_{i,j}$ and an $OP2_{i-1,j}$ are optically connected; and (2) an $IP2_{i,j}$ and an $OP1_{i,j-1}$ are optically connected, where a value range of i is 2 to M, and a value range of j is 2 to N.

At least one path that includes only one optical switch whose movable waveguide is located at a second location exists between an $IP1_{1,j}$ and an $OP1_{i,N}$; and at least one path that includes only one optical switch whose movable waveguide is located at the second location exists between an $IP2_{i,1}$ and an $OP2_{M,j}$, where a value range of i is 1 to M, and a value range of j is 1 to N.

Alternatively, at least one path on which there is only one movable waveguide that is optically coupled to a first input section or a first output section exists between an $IP1_{1,j}$ and an $OP1_{i,N}$; and at least one path on which there is only one movable waveguide that is optically coupled to a first input section or a first output section exists between an $IP2_{i,1}$ and an $OP2_{M,j}$, where a value range of i is 1 to M, and a value range of j is 1 to N.

Figure 18:
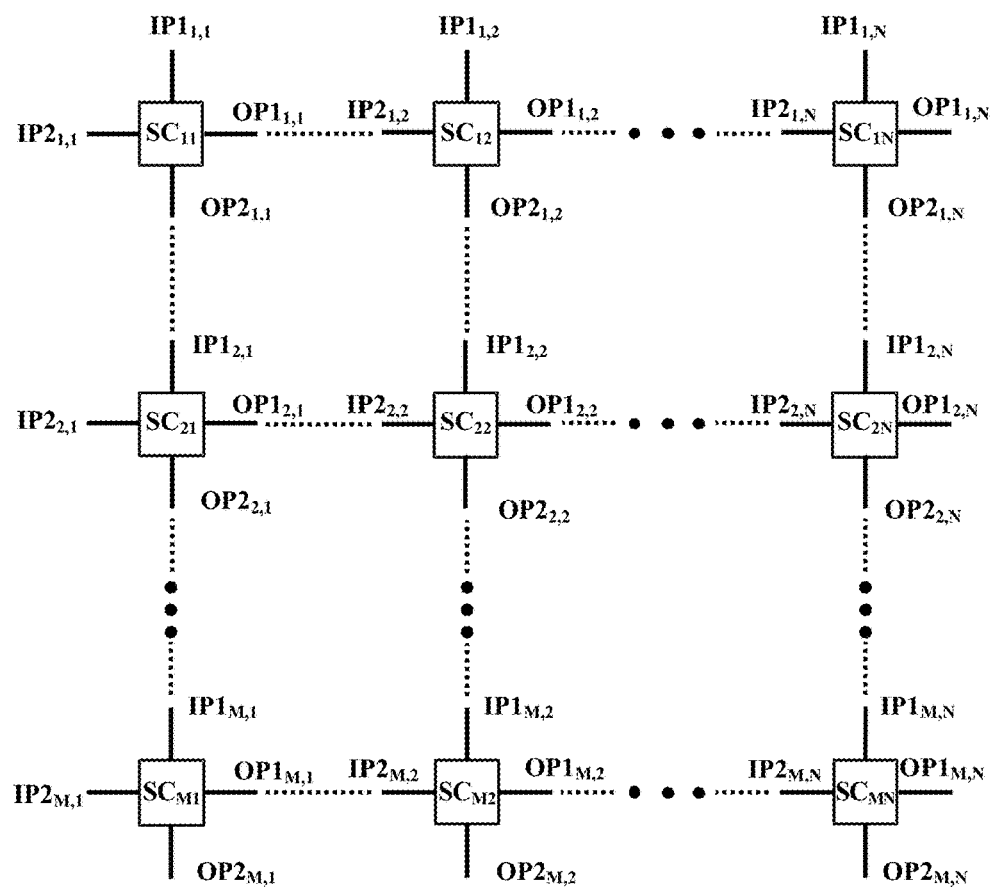
FIG. 18 is a schematic structural block diagram of an optical switching system according to an embodiment of this application.

Specifically, a connection relationship between the optical switches in the M×N optical switch matrix may be shown in FIG. 18. For example, at least one path (for example, $SC_{11} \to SC_{12} \to SC_{1N}$) that includes only one optical switch ($SC_{11}$) whose movable waveguide is located at the second location exists between an $IP1_{1,1}$ and an $OP1_{1,N}$. Alternatively, at least one path (for example, $SC_{11} \to SC_{12} \to SC_{1N}$) on which there is a movable waveguide of only one optical switch (a movable waveguide of $SC_{11}$) that is optically coupled to a first input section of $SC_{11}$ or a first output section of $SC_{11}$ exists between the $IP1_{1,1}$ and the $OP1_{1,N}$.

For another example, at least one path (for example, $SC_{21} \to SC_{22} \to SC_{2N} \to SC_{3N} \to SC_{MN}$) that includes only one optical switch ($SC_{2N}$) whose movable waveguide is located at the second location exists between an $IP2_{2,1}$ and an $OP2_{M,N}$. Alternatively, at least one path (for example, $SC_{21} \to SC_{22} \to SC_{2N} \to SC_{3N} \to SC_{MN}$) on which there is a movable waveguide of only one optical switch (a movable waveguide of $SC_2N$) that is optically coupled to a first input section of $SC_{2N}$ or a first output section of $SC_{2N}$ exists between the $IP2_{2,1}$ and the $OP2_{M,N}$.

The optical switching system in this embodiment of this application can implement a microsecond-level switching speed and has advantages such as a low insertion loss, a large quantity of ports, and low costs.

It should be noted that, based on the optical switch in the embodiments of this application, an optical switching system having another variant connection relationship may be formed through connection. For example, changing directions of an input port and an output port of the optical switching system in FIG. 18 may be implemented by making a corresponding change to the connection relationship between the optical switches. Details are not described herein.

It should be understood that the first, the second, the third, and various numbers in this specification are used for differentiation only for ease of description, instead of limiting the scope of the embodiments of this application.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should further be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate components may or may not be physically separate, and components displayed as units may or may not be physical units, may be located in one position, or may be distributed on a plurality of network units. Some or all of the units may be selected depending on actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical switch, wherein the optical switch is disposed on a substrate, and the optical switch comprises a first waveguide, a second waveguide, and a movable waveguide;
the first waveguide is immovable relative to the substrate, the first waveguide comprises a first input section and a first output section, a first input port (IP1) of the first waveguide is located at one end of the first input section, a first output port (OP1) of the first waveguide is located at one end of the first output section, and the other end of the first input section is connected to the other end of the first output section;

the second waveguide is immovable relative to the substrate, the second waveguide comprises a second input section and a second output section, a second input port (IP2) of the second waveguide is located at one end of the second input section, a second output port (OP2) of the second waveguide is located at one end of the second output section, the other end of the second input section is connected to the other end of the second output section, both the first waveguide and the second waveguide are located in a first plane, and an optical coupling relationship exists between the first waveguide and the second waveguide;

the movable waveguide is movable relative to the substrate;

when the movable waveguide is located at a first location, (1) the movable waveguide is optically decoupled from the first waveguide; and (2) the IP1 and the OP2 are optically connected, the IP2 and the OP1 are optically connected, the IP1 and the OP1 are optically blocked, and the IP2 and the OP2 are optically blocked; and when the movable waveguide is located at a second location, (1) the movable waveguide is optically coupled to the first input section or the first output section; and (2) the IP1 and the OP1 are optically connected, the IP2 and the OP2 are optically connected, the IP1 and the OP2 are optically blocked, and the IP2 and the OP1 are optically blocked.

2. The optical switch according to claim 1, wherein when the movable waveguide is located at the first location, along a transmission direction of an optical signal, an effective refractive index of the first waveguide gradually decreases, both an effective refractive index of the first input section and an effective refractive index of the first output section gradually decrease, an effective refractive index of the second waveguide gradually increases, and both an effective refractive index of the second input section and an effective refractive index of the second output section gradually increase.

3. The optical switch according to claim 1, when the movable waveguide is located at the first location, along a transmission direction of an optical signal, an effective refractive index of the first waveguide gradually increases, both an effective refractive index of the first input section and an effective refractive index of the first output section gradually increase, an effective refractive index of the second waveguide gradually decreases, and both an effective refractive index of the second input section and an effective refractive index of the second output section gradually decrease.

4. The optical switch according to claim 1, wherein along a transmission direction of an optical signal, a gap between the first waveguide and the second waveguide first gradually decreases and then gradually increases; at a minimum gap between the first waveguide and the second waveguide, the first input section is connected to the first output section, and the second input section is connected to the second output section; a gap between the first input section and the second input section gradually decreases; and a gap between the first output section and the second output section gradually increases.

5. The optical switch according to claim 1, wherein the movable waveguide is operable to move in the first plane to be optically coupled to the first input section or the first output section.

6. The optical switch according to claim 1, wherein the movable waveguide is not located in the first plane, and the movable waveguide is movable in a direction perpendicular to the first plane to be optically coupled to the first input section or the first output section.

7. The optical switch according to claim 1, wherein an effective refractive index at a junction of the first input section and the first output section is equal to an effective refractive index at a junction of the second input section and the second output section.

8. The optical switch according to claim 1, wherein along a transmission direction of an optical signal, an effective refractive index of the movable waveguide gradually changes.

9. The optical switch according to claim 1, wherein along a transmission direction of an optical signal, a width of the movable waveguide gradually changes.

10. The optical switch according to claim 1, wherein the optical switch further comprises an actuator, and a location of the movable waveguide is controlled by the actuator.

11. The optical switch according to claim 10, wherein the actuator is connected to the movable waveguide by using a cantilever.

12. The optical switch according to claim 10, wherein the actuator comprises parallel plate electrodes.

13. The optical switch according to claim 1, wherein the optical switch further comprises an optical power monitor, and the optical power monitor is configured to monitor optical power of at least one of the first waveguide, the second waveguide, the IP1, the OP1, the IP2, or the OP2.

14. An optical switching system, wherein the optical switching system is an M×N optical switch matrix, comprising M×N optical switches, each of the optical switches is disposed on a substrate, and each of the optical switches comprises a first waveguide, a second waveguide, and a movable waveguide, wherein the first waveguide is immovable relative to the substrate, the first waveguide comprises a first input section and a first output section, a first input port (IP1) of the first waveguide is located at one end of the first input section, a first output port (OP1) of the first waveguide is located at one end of the first output section, and the other end of the first input section is connected to the other end of the first output section;

the second waveguide is immovable relative to the substrate, the second waveguide comprises a second input section and a second output section, a second input port (IP2) of the second waveguide is located at one end of the second input section, a second output port (OP2) of the second waveguide is located at one end of the second output section, the other end of the second input section is connected to the other end of the second output section, both the first waveguide and the second waveguide are located in a first plane, and an optical coupling relationship exists between the first waveguide and the second waveguide;

the movable waveguide is movable relative to the substrate;

when the movable waveguide is located at a first location, (1) the movable waveguide is optically decoupled from the first waveguide; and (2) the IP1 and the OP2 are optically connected, the IP2 and the OP1 are optically connected, the IP1 and the OP1 are optically blocked, and the IP2 and the OP2 are optically blocked; and when the movable waveguide is located at a second location, (1) the movable waveguide is optically coupled to the first input section or the first output section; and (2) the IP1 and the OP1 are optically connected, the IP2 and the OP2 are optically connected, the IP1 and the OP2 are optically blocked, and the IP2 and the OP1 are optically blocked;

each of the optical switches is denoted as $SC_{i,j}$, wherein a value of i is 1, 2, . . . , or M, and a value of j is 1, 2, . . . , or N; and the M×N optical switches are set as follows: (1) an $IP1_{i,j}$ and an $OP2_{i-1,j}$ are optically connected; and (2) an $IP2_{i,j}$ and an $OP1_{i,j-1}$ are optically connected, wherein a value range of i is 2 to M, and a value range of j is 2 to N.

15. The optical switching system according to claim 14, wherein at least one path that comprises only one optical switch whose movable waveguide is located at a second location exists between an $IP1_{i,j}$ and an $OP1_{i,N}$; and at least one path that comprises only one optical switch whose movable waveguide is located at the second location exists between an $IP2_{i,1}$ and an $OP2_{M,j}$, wherein a value range of i is 1 to M, and a value range of j is 1 to N.

* * * * *